(12) United States Patent
Eftymiades et al.

(10) Patent No.: US 7,067,080 B2
(45) Date of Patent: Jun. 27, 2006

(54) PROCESS FOR THE PRODUCTION OF COMPOSITE TUBING PARTICULARLY FOR AIR CONDITIONING AND TUBING THUS OBTAINED

(75) Inventors: Georges Eftymiades, Pibrac (FR); Benjamin Lazorthes, Toulouse (FR)

(73) Assignee: Airbus France, Toulouse Cedex (FR)

( * ) Notice: Subject to any disclaimer, the term of this patent is extended or adjusted under 35 U.S.C. 154(b) by 445 days.

(21) Appl. No.: 10/284,210

(22) Filed: Oct. 31, 2002

(65) Prior Publication Data
US 2003/0082325 A1 May 1, 2003

(30) Foreign Application Priority Data
Oct. 31, 2001 (FR) .................................. 01 14147

(51) Int. Cl.
*B29C 70/42* (2006.01)
(52) U.S. Cl. ...................... 264/134; 264/257; 264/258; 264/314; 264/317; 264/324; 264/510; 264/512
(58) Field of Classification Search ........ 264/510–512, 264/135–137, 257–258, 263, 266–267, 313–314, 264/317, 324
See application file for complete search history.

(56) References Cited

U.S. PATENT DOCUMENTS

| 4,173,670 A | * | 11/1979 | VanAuken ................... 428/36 |
| 4,923,541 A | * | 5/1990 | Burger ......................... 156/87 |
| 6,555,243 B1 | * | 4/2003 | Flepp et al. ............. 428/474.4 |
| 2002/0102373 A1 | * | 8/2002 | DeMeyer ................... 428/36.2 |

FOREIGN PATENT DOCUMENTS

JP          10-337812      * 12/1998

* cited by examiner

*Primary Examiner*—Stefan Staicovici
(74) *Attorney, Agent, or Firm*—Young & Thompson

(57) ABSTRACT

A process for the production of composite tubing, particularly for air conditioning, from a structure of mineral or organic fibers, natural or artificial. The structure of fibers is impregnated with a suitable resin, and after shaping in or on a mold, the temperature and possibly the pressure is raised for polymerization of the resin, a sealing of the wall of the shaped piece being carried out in the course of this process. The structure of fibers is constituted by a single ply of a unit weight of at least about 400 g/m$^2$, which ply is impregnated with resin at an impregnation quantity of at least 40%, then there is emplaced on one of the surfaces of the single ply a coating of a sealing agent. The polymerization is carried out while the single ply and its coating have the desired shape in or on the mold.

11 Claims, 1 Drawing Sheet

PROCESS FOR THE PRODUCTION OF COMPOSITE TUBING PARTICULARLY FOR AIR CONDITIONING AND TUBING THUS OBTAINED

BACKGROUND OF THE INVENTION

The present invention relates to the production of tubing of composite material particularly adapted for air conditioning systems installed onboard aircraft.

In an aircraft, the air conditioning tubing uses recycled air. This air is cooled by heat exchangers to utilization temperatures comprised between 20° C. and 30° C. In the case of failure of these heat exchangers, the tubing is dimensioned to resist temperatures of the order of 70° C.

Moreover, in the presence of fires, said tubing must be self-extinguishing and cannot give off smoke or toxic gases to be inhaled, so as to preserve the life of the passengers and the crew members.

Finally, this tubing must be sealed, because any loss of air gives rise to the requirement for supplemental air, thereby increasing the consumption of fuel.

At present, this tubing is comprised by two layers of glass cloth impregnated with phenolic resin. The unit weight of one ply is about 300 g/m$^2$, said ply being impregnated with 40% of resin, which brings the unit weight of the ply to 420 g/m$^2$. The use of two superposed plies thereby constituting an assembly of a unit weight of 840 g/m$^2$, permits guaranteeing the structural resistance of the final product.

These two plies are draped in or on a metallic or composite mold having the final shape of the tubing. Two technologies are conventionally used as to the mold, which can be either constituted by two assembleable portions, defining a hollow having the shape of the piece to be produced, on which the plies are disposed, an inflatable bladder being then installed on the plies and then inflated to press them against the mold, or constituted by a dummy with the shape of the piece to be produced, on which said plies are draped, vacuum then being drawn between the plies and a sealing film covering these latter.

When the plies are pressed into or onto the mold, the assembly is installed in an oven or autoclave so as, either to raise the temperature alone, or to raise the temperature and the pressure, for the purpose of polymerization.

Once this first polymerization is completed, and the tubing thus produced returned to ambient temperature, a phenolic resin based varnish is applied with the help of a paint spray gun or a simple brush over all the external portion of said tubing, so as to close porosities that can exist following polymerization.

The use of said varnish causes problems as to hygiene and safety, because of the presence of the solvent contained in the phenolic resin. A second polymerization in an oven is thus carried out so as to polymerize this layer of varnish. Sealing tests (pressure/vacuum) are then carried out so as to verify the sealing of the tubing.

In the case in which sealing is defective, a second layer of varnish is then applied to the tubing, which is then returned to the oven so as again to be polymerized. Again, tests are carried out on said tubing so as to monitor its sealing. If the sealing is again defective, the tubing will be subjected to a new cycle of varnish/polymerization/tests. All the tubing thus produced is tested so as to verify its level of sealing.

Thus, this process of producing tubing is difficult and gives rise to a long production cycle as to the technological time of production of said tubing. It is not consistent with industrial objectives which are the reduction of cycle times and costs. Not only does this process slow the production cycle of the tubing, but also it uses products whose use gives rise to hygienic and safety concerns. Moreover, the tubing thus produced does not conform to the objectives of weight gain and price because two plies of pre-impregnated cloth are used, to which are added the various layers of varnish.

SUMMARY OF THE INVENTION

The object of the invention is precisely to overcome these drawbacks by providing a process for the production that will be at the same time simplified, easy to use and saving of time.

To this end, the invention has for its object a process for the production of composite tubing, particularly for air conditioning, from a structure of mineral or organic fibers, natural or artificial, in which said structure of fibers is impregnated with a suitable resin, and after shaping in or on a mold, the temperature and if desired the pressure are increased for polymerization of said resin, a sealing of the wall of the shaped piece being carried out in the course of this process, characterized in that:

a structure of fibers is used constituted by a single ply of a unit weight of at least about 400 g/m$^2$, said single ply is impregnated with said resin at an impregnation quantity of at least 40%, then a coating of a sealing agent is emplaced on one of the surfaces of said single ply, said polymerization being then carried out while said single ply and its coating have the desired shape in or on said mold.

The sealing agent is preferably constituted by self-extinguishing components such as a thin film of the PVF type or a paste of the melamine type.

Preferably, the coating based on a sealing agent is emplaced on the surface of the single ply that is to constitute the internal wall of the tubing.

According to a first mode of practicing the process, after emplacing on one of the surfaces of said single pre-impregnated ply the coating of sealing agent, there is emplaced in or on the mold the ply-coating assembly, said assembly is pressed by pressure or vacuum against the mold and said polymerization is carried out under suitable pressure and temperature.

According to a second embodiment, said single pre-impregnated ply is emplaced by draping in or on the mold, then there is emplaced on said draped ply the coating of sealing agent, then by pressure or vacuum the ply-coating assembly is pressed against the mold and said polymerization under suitable pressure and temperature is carried out.

In one and the other of these embodiments of procedure, the mold can be constituted according to one of the two technologies referred to above and disposed in an oven or an autoclave to carry out said polymerization.

Such a process permits producing tubing having structural characteristics comparable to those of tubing produced according to conventional technique and having good characteristics of sealing at the end of polymerization, which has not been repeated.

Moreover, the use of a single ply permitting enjoying a substantial gain as to price of the woven or non-woven structure and its use which is much more rapid, the tubing thus obtained having structural characteristics comparable to those produced according to the technique set forth above.

BRIEF DESCRIPTION OF THE DRAWINGS

Other characteristics and advantages will become apparent from the following description of embodiments of practice of the process of the invention, which description is given only by way of example and with respect to the accompanying drawings, in which.

DESCRIPTION OF THE PREFERRED EMBODIMENTS

Figure 1:
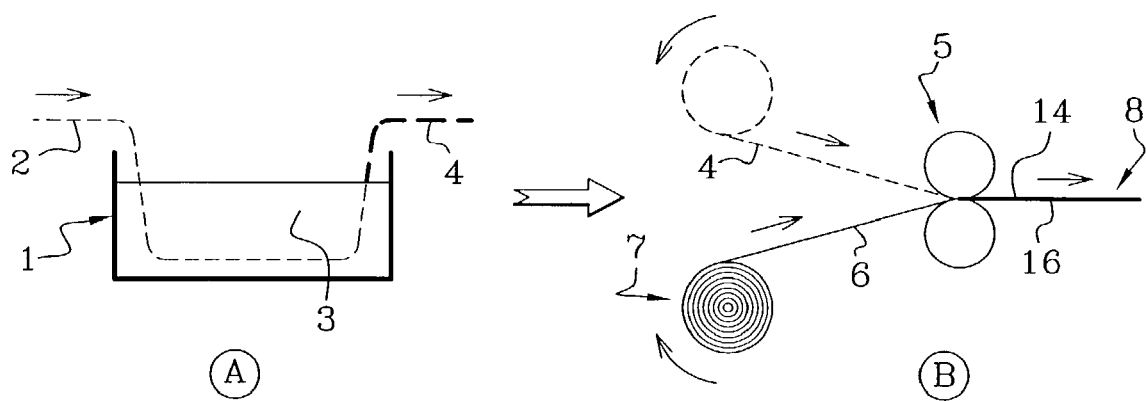
FIG. 1 shows schematically the first steps of a first embodiment of practice of the process of the invention and FIGS. 2a and 2b show a second embodiment of procedure.

According to FIG. 1, there are shown the two first steps A and B of the practice of the process of the invention.

During the first step A, there is impregnated in a vat 1 a structure of fibers for example of dry glass cloth 2 with the help of a suitable resin 3 contained in the vat 1. In the aeronautic field, the glass cloth is thus particularly appreciated for its qualities of structural strength and its low cost. Other types of cloth, for example aramide fibers, particularly Kevlar, or non-woven material, can of course be used.

The cloth 2 is, according to the invention, in the form of a single ply having a unit weight of at least about 400 g/m$^2$.

The impregnating resin 3 is for example a phenolic, epoxy or polyamide resin, and impregnation takes place continuously at an impregnation rate of at least 40%, the impregnated cloth designated by reference numeral 4 being directly usable for the production of the envisaged tubing.

Preliminarily, which is to say before shaping in a mold (not shown in FIG. 1), the impregnated cloth 4 is subjected to step B in the course of which the impregnated cloth 4, preliminarily wound, is unwound to pass between two pressure rollers 5 so as to be pressed against a thin film 6 unrolled from spool 7 and constituted by a self-extinguishing sealing agent.

The two pressure rollers 5 compress at a suitable pressure the two superposed strips 4 and 6 into a single cloth strip 8 comprising both the pre-impregnated cloth 4 and the film 6.

This strip of cloth 8 can easily for example be draped on a mold having the shape of the piece to be produced.

Preferably, the side 14 of the strip 8 on which the pre-impregnated cloth 4 is located and which has an adhesive character due to the presence of the phenolic, epoxy or polyamide resin, will be disposed against the wall of the mold so as to obtain good adherence to the mold.

The mold is constituted according to one of the two technologies described in the preamble, the assembly formed either by the two portions of the mold with the internal bladder or by a dummy, being installed in an oven or an autoclave either to raise the temperature alone, or to raise the temperature and the pressure, so as to polymerize the resin of the pre-impregnated cloth.

During polymerization, the film 6 naturally adheres to the cloth 4, thereby creating a sealing barrier on the internal surface of the tubing because the pre-impregnated cloth 4 is pressed against the mold.

The sealing agent within the tubing is thus sheltered from shock, abrasion or friction that could degrade the sealing characteristics of the tubing.

The presence of this film 6 improves the surface condition within the tubing, which accordingly improves the flow of the fluid in said tubing. Moreover, in the case of a two-part mold with an internal bladder, de-molding is facilitated because of the absence of contact between the pre-impregnated cloth 4 and the silicone elements of the bladder compressing said cloth 4 against the mold.

It is to be noted that a single ply of pre-impregnated cloth 4 is used to produce the tubing whilst previously two plies were necessary, which divides by 2 the draping operation. Even if the use of a larger quantity of impregnating resin increases the weight of this single ply, whose unit weight is greater than 400 g/m$^2$, the tubing thus produced nevertheless has a final weight lower than the cumulative weight of the two plies of the prior art. The use of a single ply also permits carrying out a substantial gain as to cost of the pre-impregnated cloth and its production.

Although the use of a sealing agent does not permit omitting sealing tests to verify the sealing of the tubing, these tests have nevertheless shown that the tubing obtained according to the process of the invention has good sealing characteristics upon first polymerization. Thus, it has been noted that the quantity of tubing produced according to the invention which, according to tests, has been shown to be defective, and which has had to be treated by a supplemental varnish applied by means of a brush, does not represent more than a low percentage, less than 10%, of all the produced tubing. Moreover, in the case of a sealing defect, the good sealing characteristics of the tubing produced according to the process of the invention do not require, to obtain the desired sealing, more than a single application of said varnish, which thus contributes to decreasing the production cycles.

Preferably, said sealing agent is in the form of a thin self-extinguishing film, integrated with said composite pre-impregnated cloth layer before the phase of production of the tubing.

Instead of a thin film, said sealing agent could be present in the form of a paste, particularly a gel coating of the self-extinguishing melamine type, deposited on said pre-impregnated cloth 4, before the phase of production of the tubing.

The paste can be spread by brush over one of the surfaces of the cloth 4.

The sealing agent can be integrated in the woven or non-woven armature and pre-impregnated, during the phase of production of the tubing and no longer before it, as has been described.

Figures 2A, 2B:
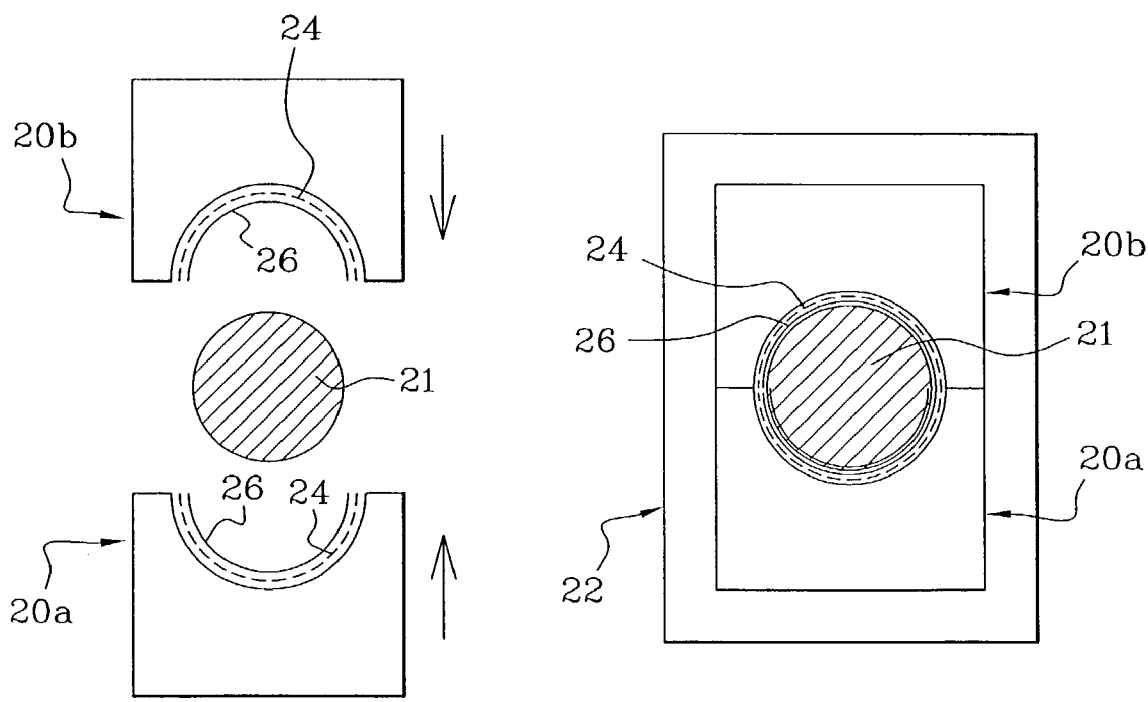

Such a modification of embodiment is shown in FIGS. 2a and 2b in the framework of the production of a cylindrical tube with the help of a mold in two parts, respectively 20a and 20b, each having a semi-cylindrical hollow shape on which is draped a single ply of pre-impregnated cloth 24.

As in the preceding example, the single ply is constituted by a woven or non-woven structure of dry fibers, of a unit weight of at least 400 g/m$^2$, pre-impregnated with a suitable resin, for example of the phenolic, epoxy or polyamide type.

The sealing agent, for example a thin film 26, is then draped from above onto said single ply 24. In the case in which said sealing agent is a paste as defined above, the latter is applied on the plies 24 when these latter are in place in the mold (20a, 20b).

An inflatable bladder 21 is emplaced in the mold before the approach and closing of the two portions 20a, 20b and the assembly (FIG. 2b) is installed in an oven or an autoclave 22 so as to raise either the temperature alone, the pressure being ensured by the bladder alone, or the temperature and the pressure, to carry out polymerization.

After de-molding of the tubing, final sealing tests are carried out by placing the tubing under pressure, then under vacuum. As in the preceding case, if a defect of sealing is detected, a layer of varnish, and one only, will then be applied by brush to the defective piece so as to restore the total sealing of the tubing. A second and final polymerization will then be carried out.

Finally, the invention is clearly not limited to the embodiments of operation shown and described above, but on the contrary covers all variations, particularly as to the nature of the sealing agent and its methods of emplacement, as well as the nature of the fibers of the cloth and of the impregnation resin.

The invention claimed is:

1. A process for the production of composite tubing from a structure of mineral or organic fibers, natural or artificial, in which said structure of fibers is impregnated with a suitable resin and after shaping in or on a mold, the temperature is raised for polymerization of said resin, a sealing of a wall of the tubing being carried out in the course of this process, wherein,
   there is used a fiber structure constituted by a single ply (2, 24) of a unit weight of at least about 400 g/m$^2$,
   said single ply (2, 24) is impregnated with said resin at an impregnation quantity of at least 40%,
   then there is placed on one of the surfaces of said single ply (2, 24) a coating (6, 26) of a sealing agent,
   said polymerization being carried out while said single ply (2, 24) and its coating (6, 26) are in the desired shape in or on said mold (20a, 20b).

2. The process according to claim 1, wherein said sealing agent is constituted by a thin self-extinguishing film (6).

3. The process according to claim 2, wherein said film (6) is pressed against a cloth (4) of fibers previously impregnated with a suitable resin and constituting said single ply (4), so as to obtain a single strip of which one of the surfaces is constituted by said impregnated cloth and the other surface is constituted by the film of a sealing agent, said strip being then draped in or on a mold of suitable shape.

4. The process according to claim 3, wherein said surface of the strip constituted by the impregnated cloth (4) is disposed against the wall of the mold.

5. The process according to claim 1, wherein said sealing agent is constituted by a paste.

6. The process according to claim 5, wherein the sealing agent constituted by said paste is applied against one of the surfaces of a cloth of previously impregnated fibers (4) constituting said single ply, then the assembly is draped in or on a mold of suitable shape.

7. The process according to claim 6, wherein the surface of the ply (4) that is not covered with said sealing agent is disposed against the wall of the mold.

8. The process according to claim 1, wherein said single pre-impregnated ply (24) is emplaced by draping in or on the mold (20a, 20b), then the coating of sealing agent (26) is emplaced on said draped ply (24), then the ply-coating assembly is pressed against the mold (20a, 20b) and said polymerization is carried out in an oven or an autoclave (22).

9. The process according to claim 5, wherein the paste is a self-extinguishing melamine paste.

10. The process according to claim 1, wherein the composite tubing is air conditioning tubing.

11. The process according to claim 1, wherein pressure is also raised during polymerization of said resin.

\* \* \* \* \*